(12) United States Patent
Susumago

(10) Patent No.: US 12,145,596 B2
(45) Date of Patent: Nov. 19, 2024

(54) CABIN-INSIDE DETECTION DEVICE AND CABIN-INSIDE DETECTION METHOD

(71) Applicant: Mitsubishi Electric Corporation, Tokyo (JP)

(72) Inventor: Yuki Susumago, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 247 days.

(21) Appl. No.: 17/918,281

(22) PCT Filed: May 20, 2020

(86) PCT No.: PCT/JP2020/019884
§ 371 (c)(1),
(2) Date: Oct. 11, 2022

(87) PCT Pub. No.: WO2021/234836
PCT Pub. Date: Nov. 25, 2021

(65) Prior Publication Data
US 2023/0166737 A1    Jun. 1, 2023

(51) Int. Cl.
*B60W 40/08* (2012.01)
*G06V 20/59* (2022.01)

(52) U.S. Cl.
CPC ........... *B60W 40/08* (2013.01); *G06V 20/593* (2022.01); *B60W 2040/0881* (2013.01);
(Continued)

(58) Field of Classification Search
CPC ......... B60W 40/08; B60W 2040/0881; B60W 2420/403; B60W 2420/408; B60R 21/0153; B60N 2210/20; B60N 2/002
See application file for complete search history.

(56) References Cited

U.S. PATENT DOCUMENTS

2008/0143085 A1* 6/2008 Breed ............... G08B 21/24
                                                  280/735
2020/0116847 A1* 4/2020 Jeon ................ G01S 13/48
(Continued)

FOREIGN PATENT DOCUMENTS

JP    2018-202921 A    12/2018

OTHER PUBLICATIONS

International Search Report for PCT/JP2020/019884 mailed on Jul. 28, 2020.
(Continued)

*Primary Examiner* — Khoi H Tran
*Assistant Examiner* — Dairon Estevez
(74) *Attorney, Agent, or Firm* — Birch, Stewart, Kolasch & Birch, LLP

(57) ABSTRACT

A first data acquiring unit to acquire first data acquired by a first sensor, a second data acquiring unit to acquire second data acquired by a second sensor installed above a seat in a cabin, a front-seat occupant position estimating unit to estimate a position of an occupant on a basis of the first data acquired by the first data acquiring unit, a detection range determining unit to determine a detection range of the second sensor on a basis of the position of the front-seat occupant estimated by the front-seat occupant position estimating unit, and a rear-seat occupant detecting unit to detect a rear-seat occupant on a basis of the second data acquired by the second data acquiring unit and the detection range of the second sensor determined by the detection range determining unit are provided.

7 Claims, 10 Drawing Sheets

(52) U.S. Cl.
CPC . *B60W 2420/403* (2013.01); *B60W 2420/408* (2024.01); *B60W 2540/227* (2020.02)

(56) References Cited

U.S. PATENT DOCUMENTS

| | | | |
|---|---|---|---|
| 2020/0292686 A1* | 9/2020 | Murata | B60N 2/0022 |
| 2020/0327344 A1* | 10/2020 | Nakagawa | G06T 7/00 |
| 2022/0172489 A1* | 6/2022 | Wieczorek | B60Q 3/731 |

OTHER PUBLICATIONS

Written Opinion of the International Searching Authority for PCT/JP2020/019884 mailed on Jul. 28, 2020.

* cited by examiner

CABIN-INSIDE DETECTION DEVICE AND CABIN-INSIDE DETECTION METHOD

TECHNICAL FIELD

The present disclosure relates to a cabin-inside detection device and a cabin-inside detection method.

BACKGROUND ART

A technique for detecting an occupant (hereinafter, referred to as a "rear-seat occupant") present in a rear seat (hereinafter, referred to as a "rear seat") on the basis of a radio wave sensor installed in a cabin is known.

For example, Patent Literature 1 discloses an occupant state detection system that detects a rear-seat occupant by using a radio wave sensor disposed in a front seat (hereinafter, referred to as a "front seat") and transmitting a radio wave from a position where the sensor is disposed, to the rear seat.

CITATION LIST

Patent Literature

Patent Literature 1: JP 2018-202921 A

SUMMARY OF INVENTION

Technical Problem

When the radio wave sensor is installed in the front seat as in the occupant state detection system disclosed in Patent Literature 1, there is a possibility that the rear-seat occupant cannot be detected due to vibration of the front seat, a seat back pocket installed in the front seat, or the like.

Thus, a method of detecting a rear-seat occupant by installing a radio wave sensor above the seat and transmitting a radio wave from the installation position toward the rear seat is conceivable.

However, when the radio wave sensor is installed above the seat, there is a possibility that an occupant present in a front seat (hereinafter referred to as a "front-seat occupant") is erroneously detected as the rear-seat occupant depending on a seated state of the front-seat occupant. The seated state of the front-seat occupant is a posture, a seated position, or the like of the front-seat occupant.

The present disclosure has been made to solve the above problems, and an object of the present disclosure is to detect a rear-seat occupant in consideration of a seated state of a front-seat occupant.

Solution to Problem

A cabin-inside detection device according to the present disclosure, includes: processing circuitry configured to acquire first data acquired by a first sensor; acquire second data acquired by a second sensor installed above a seat in a cabin; estimate a position of a front-seat occupant on a basis of the acquired first data; determine a detection range of the second sensor on a basis of the estimated position of the front-seat occupant; and detect a rear-seat occupant on a basis of the acquired second data and the determined detection range of the second sensor.

Advantageous Effects of Invention

According to the present disclosure, the cabin-inside detection device can detect the rear-seat occupant in consideration of the seated state of the front-seat occupant.

DESCRIPTION OF EMBODIMENTS

In order to explain the present disclosure in more detail, a mode for carrying out the present disclosure will be described below with reference to the accompanying drawings.

First Embodiment

Figure 1A:
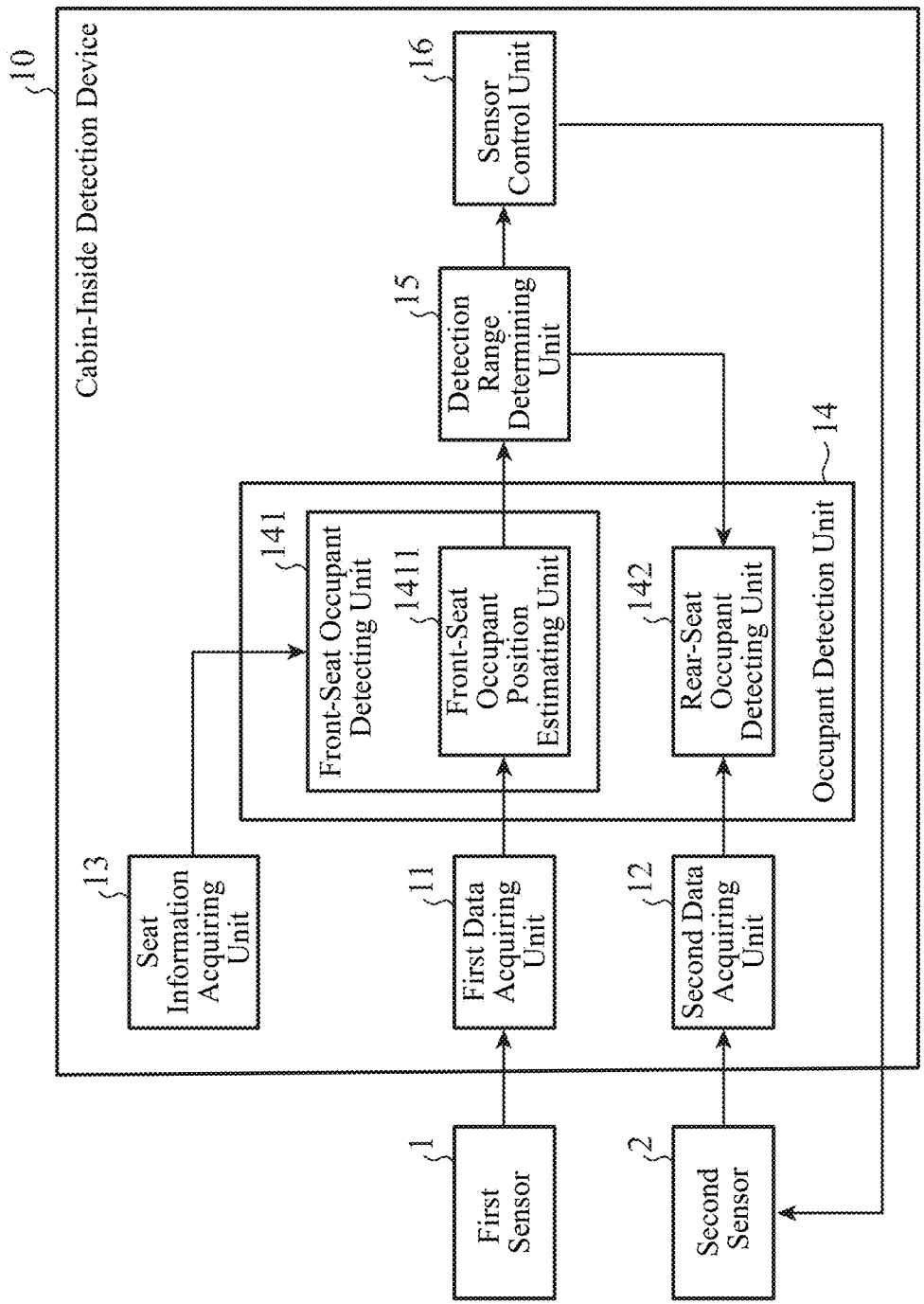
FIG. 1A is a block diagram illustrating a configuration example of a cabin-inside detection device according to a first embodiment.

FIG. 1A is a block diagram illustrating a configuration example of a cabin-inside detection device 10 according to a first embodiment. The cabin-inside detection device 10 is connected to a first sensor 1 and a second sensor 2. The first sensor 1, the second sensor 2, and the cabin-inside detection device 10 are mounted on a vehicle 30 (see FIG. 2).

The first sensor 1 and the second sensor 2 are sensors capable of detecting an occupant in the vehicle, and are, for example, cameras or radars. The radar uses a frequency band such as a microwave band or a millimeter wave in a high frequency band lower than an optical frequency region.

The cabin-inside detection device 10 detects an occupant present in the cabin on the basis of data output from the first sensor 1 and the second sensor 2. The cabin-inside detection device 10 can accurately detect a rear-seat occupant by a combination of first data and second data.

When detecting the rear-seat occupant, the cabin-inside detection device 10 detects the rear-seat occupant on the basis of the second data acquired by the second sensor 2 in consideration of the position of a front-seat occupant estimated based on the first data acquired by the first sensor 1.

The occupant detection by the cabin-inside detection device 10 may be performed while the vehicle 30 is traveling, or may be performed after the vehicle 30 stops. The timing at which the cabin-inside detection device 10 performs occupant detection may be the moment when the vehicle 30 stops or may be after a lapse of a certain time from the moment when the vehicle 30 stops. Here, the stop of the vehicle 30 may be a temporary stop (that is, a stop) or a continuous stop (that is, parking). The cabin-inside detection device 10 is only required to acquire information indicating whether or not the vehicle 30 has stopped, such as information on a shift lever or a parking brake, from the vehicle 30.

The cabin-inside detection device 10 includes a first data acquiring unit 11, a second data acquiring unit 12, a seat information acquiring unit 13, an occupant detection unit 14, a detection range determining unit 15, and a sensor control unit 16.

The occupant detection unit 14 includes a front-seat occupant detecting unit 141 and a rear-seat occupant detecting unit 142. The front-seat occupant detecting unit 141 includes a front-seat occupant position estimating unit 1411.

The first data acquiring unit 11 acquires the first data acquired by the first sensor 1. The first data acquiring unit 11 outputs the acquired first data to the front-seat occupant detecting unit 141 of the occupant detection unit 14.

The second data acquiring unit 12 acquires the second data acquired by the second sensor 2. The second data acquiring unit 12 outputs the acquired second data to the rear-seat occupant detecting unit 142 of the occupant detection unit 14.

The seat information acquiring unit 13 acquires information related to a seat in the cabin (hereinafter, referred to as "seat information"). The seat information is, for example, information related to a slide position in the forward-and-backward direction of the seat, an angle of a backrest of the seat, or a height of its seat surface. The seat information acquiring unit 13 acquires seat information from, for example, a seat control unit (not illustrated) provided in the vehicle 30. The seat control unit drives, for example, a sliding motor (not illustrated) or a reclining motor (not illustrated) to control a slide position in the forward-and-backward direction of the seat, an angle of the backrest of the seat, or a height of the seat surface.

The seat information acquiring unit 13 outputs the acquired seat information to the front-seat occupant detecting unit 141 of the occupant detection unit 14.

The occupant detection unit 14 detects an occupant present in the vehicle 30 on the basis of the first data acquired by the first data acquiring unit 11 or the second data acquired by the second data acquiring unit 12.

The front-seat occupant detecting unit 141 of the occupant detection unit 14 detects a front-seat occupant of the vehicle 30 on the basis of the first data acquired by the first data acquiring unit 11.

When the front-seat occupant detecting unit 141 detects the front-seat occupant, the front-seat occupant position estimating unit 1411 estimates the position of the front-seat occupant on the basis of the first data acquired by the first data acquiring unit 11 and the seat information acquired by the seat information acquiring unit 13. In the first embodiment, as an example, the position of the front-seat occupant is the head position of the front-seat occupant.

The front-seat occupant position estimating unit 1411 outputs information related to the estimated position of the front-seat occupant to the detection range determining unit 15.

Note that, when the front-seat occupant is not detected, the front-seat occupant detecting unit 141 outputs information indicating that the front-seat occupant is not detected to the detection range determining unit 15.

The rear-seat occupant detecting unit 142 of the occupant detection unit 14 detects a rear-seat occupant of the vehicle 30 on the basis of the second data acquired by the second data acquiring unit 12 and the detection range of the second sensor 2 determined by the detection range determining unit 15.

Specifically, the rear-seat occupant detecting unit 142 detects a rear-seat occupant on the basis of the second data acquired in the detection range of the second sensor 2.

The occupant detection by the occupant detection unit 14 may be performed by analyzing the acquired data, or may be performed by comparing the acquired data with data prepared in advance or a threshold.

The detection range determining unit 15 determines the detection range of the second sensor 2 on the basis of the position of the front-seat occupant estimated by the front-seat occupant position estimating unit 1411. Details of the detection range of the second sensor 2 determined by the detection range determining unit 15 will be described later.

When the position of the front-seat occupant estimated by the front-seat occupant position estimating unit 1411 is within a rear-seat occupant undetectable area in the cabin, the detection range determining unit 15 determines that detection of the rear-seat occupant based on the second data acquired by the second sensor 2 is impossible, and determines that there is no detection range of the second sensor 2. In the first embodiment, the "rear-seat occupant undetectable area" is an area in which it is assumed that the rear-seat occupant cannot be correctly detected due to the front-seat occupant when the front-seat occupant is detected in the rear-seat occupant undetectable area. The rear-seat occupant undetectable area is appropriately set. Details of the rear-seat occupant undetectable area will be described later.

The detection range determining unit 15 outputs information on the determined detection range of the second sensor 2 to the rear-seat occupant detecting unit 142.

When determining that there is no detection range of the second sensor 2, the detection range determining unit 15 outputs information indicating that it is determined that there is no detection range of the second sensor 2 to the rear-seat occupant detecting unit 142 and the sensor control unit 16.

When the detection range determining unit 15 determines that there is no detection range of the second sensor 2, the sensor control unit 16 turns off the power of the second sensor 2. Specifically, for example, the sensor control unit 16 transmits a control signal for turning off the power of the second sensor 2 to the second sensor 2.

Hereinafter, an example in which the first sensor 1 is a camera and the second sensor 2 is a radar that transmits a millimeter wave will be described. Note that the following embodiments are merely examples, and the present disclosure is not limited by these embodiments.

Figure 1B:
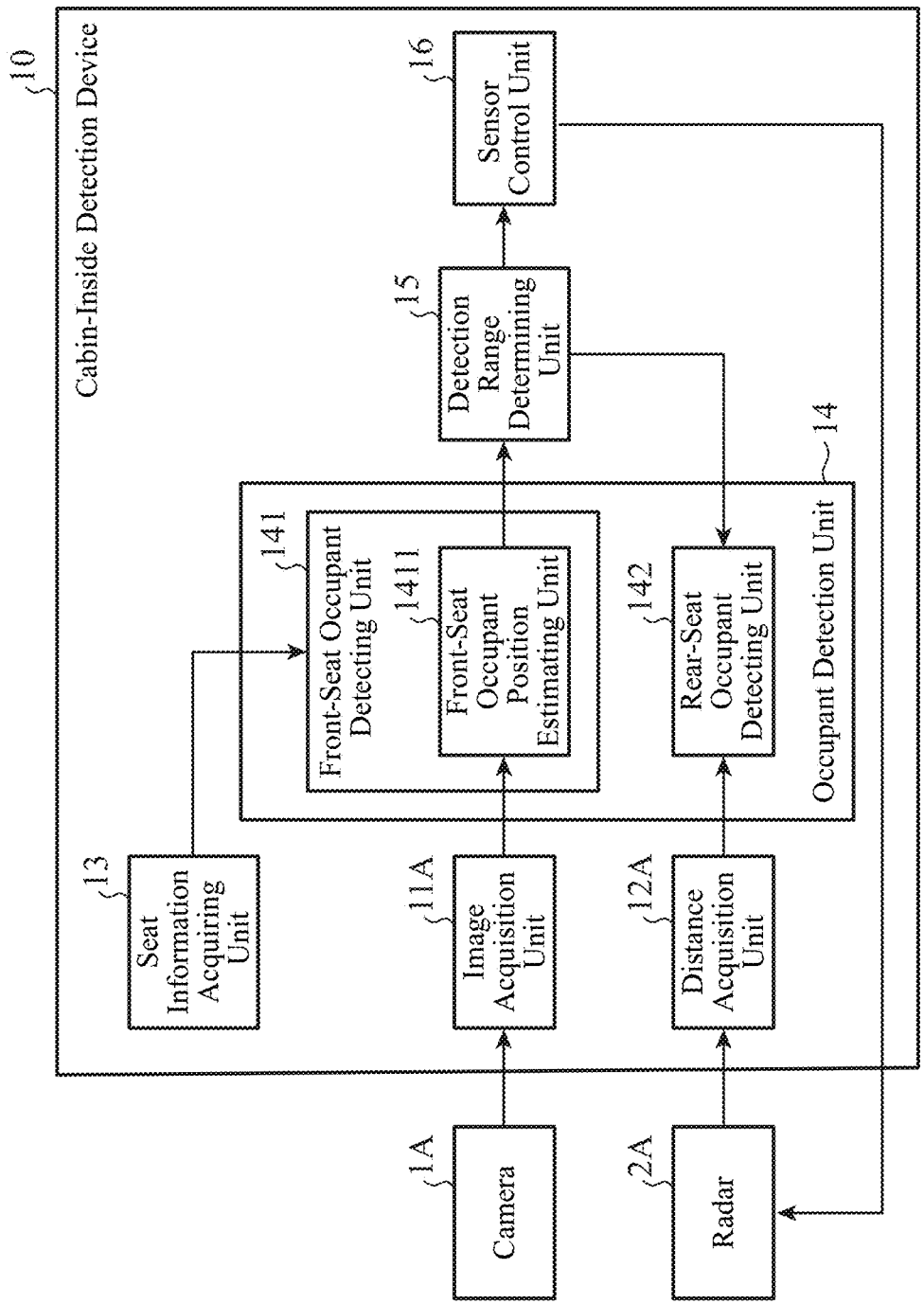
FIG. 1B is a block diagram illustrating another configuration example of the cabin-inside detection device according to the first embodiment.

FIG. 1B is a block diagram illustrating a configuration example of the cabin-inside detection device 10 according to the first embodiment, in which a camera 1A is used as the first sensor 1 and a radar 2A is used as the second sensor 2. In this example, the first data acquiring unit 11 is referred to as an image acquisition unit 11A that acquires image data captured by the camera 1A, and the second data acquiring unit 12 is referred to as a distance acquisition unit 12A that acquires distance data measured by the radar 2A.

Figure 2A:
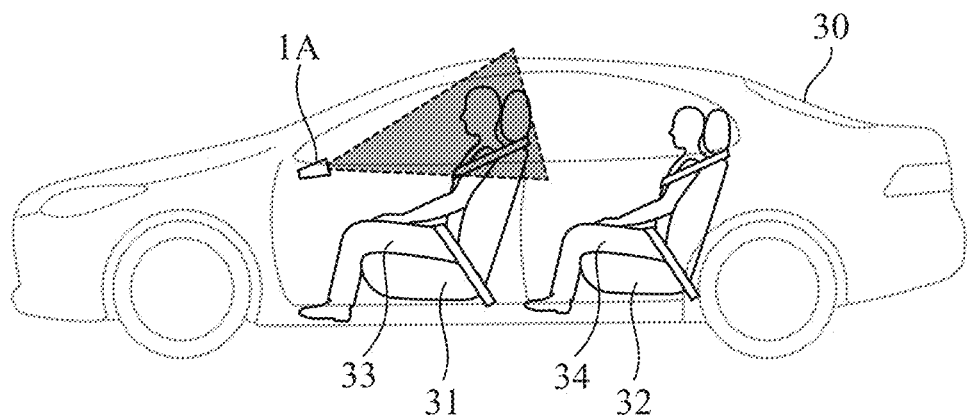
FIG. 2A is a diagram illustrating an installation example of a camera in a vehicle in the first embodiment.
Figure 2B:
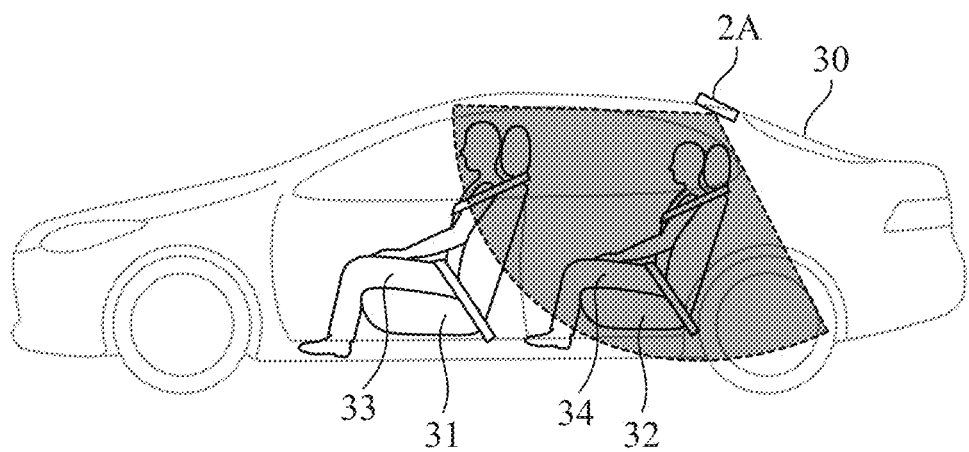
FIG. 2B is a diagram illustrating an installation example of a radar in a vehicle in the first embodiment.

FIG. 2 is a diagram illustrating an installation example of the camera 1A and the radar 2A in the vehicle 30. FIG. 2A is a diagram illustrating an installation example of the camera 1A, and FIG. 2B is a diagram illustrating an installation example of the radar 2A.

Figure 3A:
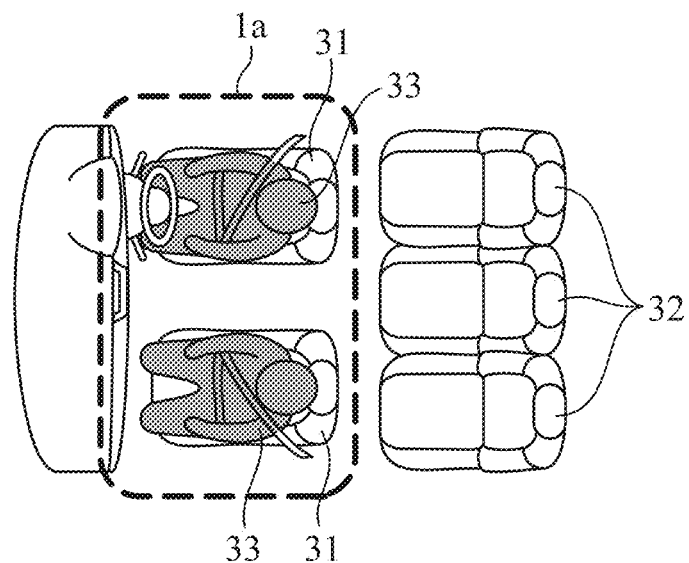
FIG. 3A is a diagram illustrating an example of a concept of an imagable range of the camera in the first embodiment.
Figure 3B:
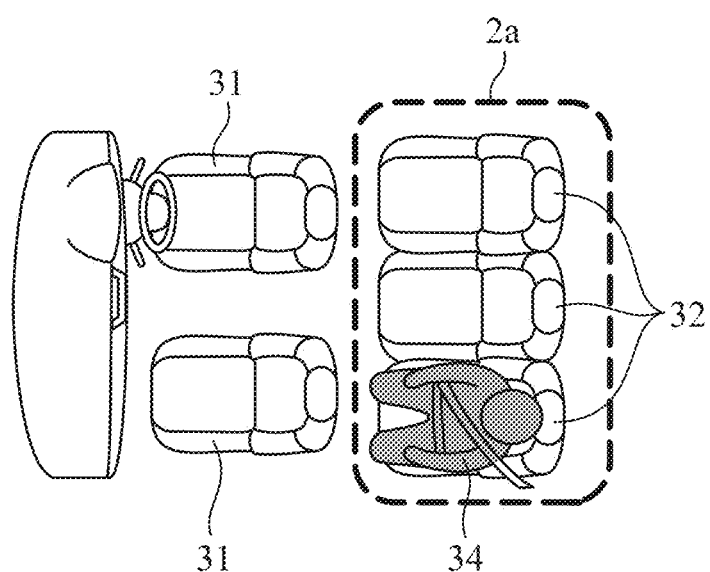
FIG. 3B is a diagram illustrating an example of a concept of a detectable range of the radar in the first embodiment.

FIG. 3 is a diagram illustrating an example of a concept of a range (hereinafter, referred to as an "imageable range") 1a that can be imaged by the camera 1A and an example of a concept of a range (hereinafter, referred to as a "detectable range") 2a in which the radar 2A can detect an object in the cabin. FIG. 3A is a diagram illustrating an example of a concept of the imageable range 1a of the camera 1A, and FIG. 3B is a diagram illustrating an example of an image of the detectable range 2a of the radar 2A.

In the illustrated examples of FIGS. 2 and 3, front-seat occupants 33 and a rear-seat occupant 34 are seated on the front seats 31 and the rear seat 32, respectively. Note that, in the illustrated examples of FIGS. 2 and 3, the front-seat occupants 33 are a driver and an occupant in the passenger seat, and the rear-seat occupant 34 is an occupant seated behind the passenger seat. In the illustrated examples of FIGS. 2 and 3, both the front-seat occupants 33 and the rear-seat occupant 34 are adults.

The camera 1A is installed on an instrument panel, a dashboard, or the like in a front part in the cabin, and images at least the front seats 31. The camera 1A may be shared with, for example, a camera of a so-called "Driver Monitoring System (DMS)" mounted on the vehicle 30 for monitoring a state of the driver in the cabin.

The radar 2A is installed above the rear seats 32. Above the rear seats 32 means an upper side with respect to the rear seats 32. Note that, in the first embodiment, the upper side with respect to the seats installed in the cabin, such as the front seats 31 or the rear seats 32, means the upper side with respect to the headrests of the seat in a state where the headrests of the seat are at the highest position.

The radar 2A transmits a millimeter wave to the rear seats 32, and receives a reflected wave of the millimeter wave reflected by a moving object. The radar 2A measures the distance from the installation position of the radar 2A to the moving object on which the millimeter wave is reflected using the transmission/reception result of the millimeter wave. Note that, by using the radar 2A, the cabin-inside detection device 10 can detect the occupant from movement of the chest caused by breathing, heartbeat, or the like.

In the imageable range 1a of the camera 1A, there is a blind spot such as a portion hidden by the front seat 31, and the cabin-inside detection device 10 cannot detect an occupant present in the blind spot only from the image (hereinafter, referred to as a "cabin-inside image") captured by the camera 1A. Even if the number of installed cameras 1A is increased to eliminate the blind spot that does not appear in the cabin-inside image, the cabin-inside detection device 10 cannot detect an occupant whose entire body is covered with a blanket or the like, for example.

In order to detect an occupant present in a blind spot that does not appear in the cabin-inside image or an occupant whose entire body is covered with a blanket or the like, for example, a method of performing occupant detection by a sensor (membrane switch) installed under a seat is also conceivable. However, in this method, it is not possible to determine a difference in physique of an occupant, for example, whether or not there is a child with a light weight, an infant placed on a child seat, or a pet.

In recent years, leaving a pet or an infant in a cabin has become a social problem, and occupant detection in consideration of a difference in physique is desired.

Therefore, studies are under way regarding a radio wave sensor mounted in the cabin, which is capable of accurately detecting occupants in consideration of various differences in physique, various postures, or infants on child seats, using radio waves transmitted by the radio wave sensor. The radio wave transmitted by the radio wave sensor can react to the occupant who does not appear in the cabin-inside image. In addition, since the radio wave passes through resin, a blanket, and the like, it is also possible to detect an occupant whose entire body is covered with a blanket or the like. In the occupant detection using the radio wave sensor, it is also possible to determine a difference in physique of a detected occupant.

Also in the first embodiment, the cabin-inside detection device 10 detects the rear-seat occupant 34, who is particularly difficult to detect, by using the radio wave sensor, specifically, the radar 2A. The cabin-inside detection device 10 combines the camera 1A and the radar 2A to improve the accuracy of occupant detection. In addition, the cabin-inside detection device 10 performs occupant detection in consideration of the difference in physique of the occupant by the millimeter wave transmitted by the radar 2A. The occupant detection in consideration of the difference in physique of the occupant by the millimeter wave transmitted by the radar 2A will be described later with a specific example.

The cabin-inside detection device 10 includes the image acquisition unit 11A, the distance acquisition unit 12A, the seat information acquiring unit 13, the occupant detection unit 14, the detection range determining unit 15, and the sensor control unit 16.

The occupant detection unit 14 includes the front-seat occupant detecting unit 141 and the rear-seat occupant detecting unit 142. The front-seat occupant detecting unit 141 includes the front-seat occupant position estimating unit 1411.

The image acquisition unit 11A acquires, from the camera 1A, image data obtained by imaging inside the cabin by the camera 1A. The image acquisition unit 11A outputs the image data acquired from the camera 1A to the front-seat occupant detecting unit 141 of the occupant detection unit 14.

The distance acquisition unit 12A acquires, from the radar 2A, distance data obtained by measuring the distance to each object in the cabin by the radar 2A. The distance acquisition unit 12A outputs the distance data acquired from the radar 2A to the rear-seat occupant detecting unit 142 of the occupant detection unit 14.

The seat information acquiring unit 13 acquires seat information.

The seat information acquiring unit 13 outputs the acquired seat information to the front-seat occupant detecting unit 141 of the occupant detection unit 14.

The occupant detection unit 14 detects an occupant present in the vehicle 30 on the basis of the image data acquired by the image acquisition unit 11A or the distance data acquired by the distance acquisition unit 12A.

The front-seat occupant detecting unit 141 of the occupant detection unit 14 detects each front-seat occupant 33 on the basis of the image data acquired by the image acquisition unit 11A.

Specifically, for example, the front-seat occupant detecting unit 141 may analyze a cabin-inside image based on image data using a known image recognition technology to detect each front-seat occupant 33. For example, the front-seat occupant detecting unit 141 can also determine whether or not a front-seat occupant 33 dozes off, the front-seat occupant 33 is drowsy, or the front-seat occupant 33 is looking aside, from the degree of eye opening, the face direction, or the like of the front-seat occupant 33. For example, in a case where the front-seat occupant 33 is present in the passenger seat, the front-seat occupant detecting unit 141 may feed back a determination result of dozing off or drowsiness to a control device that performs control for maintaining a comfortable environment in the cabin, such as a reproduction control device (not illustrated) that reproduces music or an air conditioning control device (not illustrated) that controls air conditioning in the cabin.

When the front-seat occupant detecting unit 141 detects each front-seat occupant 33, the front-seat occupant position estimating unit 1411 estimates the position of each front-seat occupant 33 on the basis of the image data acquired by the image acquisition unit 11A and the seat information acquired by the seat information acquiring unit 13. As described above, in the first embodiment, the position of the front-seat occupant 33 is the head position of the front-seat occupant 33. Here, for example, the front-seat occupant position estimating unit 1411 sets the center of the face of the front-seat occupant 33 in the cabin-inside image based on the image data as the head position of the front-seat occupant 33.

Specifically, for example, the front-seat occupant position estimating unit 1411 first detects the face of the front-seat occupant 33 using a known image recognition technology on the basis of the image data. Then, the front-seat occupant position estimating unit 1411 determines the size of the detected face of the front-seat occupant 33. The front-seat occupant position estimating unit 1411 may determine the size of the face of the front-seat occupant 33 depending on where the face is located on the coordinates of the cabin-inside image based on the image data. The front-seat occupant position estimating unit 1411 determines the distance between the camera 1A and the center of the face of the front-seat occupant 33 from the determined size of the face of the front-seat occupant 33. For example, in a case where an adult with a standard face size sits on a standard position of the front seat 31, the size of the face appearing on the cabin-inside image and the distance between the camera 1A and the center of the face are stored in advance as the size of the face as a reference at the reference position and the distance between the camera 1A and the center of the face. The standard position of the front seat 31 is a seating position when an adult with a standard face size sits on a seat that is a standard slide position, a standard seat surface height, and a standard backrest inclination.

The front-seat occupant position estimating unit 1411 can determine the distance between the camera 1A and the center of the face of the front-seat occupant 33 by comparing the reference size of the face with the determined size of the face of the front-seat occupant 33. For example, when the size of the face of the front-seat occupant 33 is larger than the reference size of the face, the center of the face of the front-seat occupant 33 is closer to the camera 1A by that amount. In other words, the distance between the camera 1A and the center of the face of the front-seat occupant 33 is shorter than the distance between the camera 1A and the center of a reference face set in advance.

When determining the distance between the camera 1A and the center of the face of the front-seat occupant 33, the front-seat occupant position estimating unit 1411 determines the distance between the camera 1A and the face of the front-seat occupant 33 in consideration of how much the current slide position, height of the seat surface, and inclination of the front seat 31 deviate from the reference seat position, height of the seat surface, and inclination of a standard seat, respectively, on the basis of the seat information.

For example, it is assumed that the current slide position of the front seat 31 is forward of the standard slide position of the seat. In addition, it is assumed that the face size of the front-seat occupant 33 is extremely smaller than the standard face size. In this case, the face of the front-seat occupant 33 appearing in the cabin-inside image can have substantially the same size as a standard face size. When determining the distance between the camera 1A and the center of the face of the front-seat occupant 33 only from the cabin-inside image, the front-seat occupant position estimating unit 1411 determines the distance between the camera 1A and the center of the face of the front-seat occupant 33 assuming that the front-seat occupant 33 is seated at the standard position. Therefore, the front-seat occupant position estimating unit 1411 considers the seat information when estimating the position of the front-seat occupant 33. The front-seat occupant position estimating unit 1411 recognizes that the front-seat occupant 33 is seated at a position forward of the standard position by considering the seat information. Then, the front-seat occupant position estimating unit 1411 can more accurately determine the distance between the camera 1A and the center of the face of the front-seat occupant 33.

Since the installation position and the angle of view of the camera 1A are known in advance, if the distance between the camera 1A and the center of the face of the front-seat occupant 33 can be estimated, the front-seat occupant position estimating unit 1411 can estimate the center position of the face of the front-seat occupant 33 in the cabin, in other words, the position of the front-seat occupant 33.

The front-seat occupant position estimating unit 1411 outputs information regarding the estimated position of the front-seat occupant 33 to the detection range determining unit 15.

Note that, when the front-seat occupant 33 is not detected, the front-seat occupant detecting unit 141 outputs information indicating that the front-seat occupant 33 is not detected to the detection range determining unit 15.

The rear-seat occupant detecting unit 142 of the occupant detection unit 14 detects the rear-seat occupant 34 of the vehicle 30 on the basis of the distance data acquired by the distance acquisition unit 12A and the detection range of the radar 2A determined by the detection range determining unit 15.

Specifically, for example, the rear-seat occupant detecting unit 142 detects whether or not the rear-seat occupant 34 of the vehicle 30 is present on the basis of the distance data acquired in the detection range of the radar 2A.

When the detection range determining unit 15 determines that there is no detection range of the radar 2A, the rear-seat occupant detecting unit 142 does not detect the rear-seat occupant 34.

The detection range determining unit 15 determines the detection range of the radar 2A on the basis of the position of the front-seat occupant 33 estimated by the front-seat occupant position estimating unit 1411.

Here, the detection range of the radar 2A determined by the detection range determining unit 15 will be described.

The detection range determining unit 15 divides the detectable range 2a of the radar 2A into a plurality of areas (hereinafter, referred to as "divided areas"), and determines a divided area to be used as an area for detecting the rear-seat occupant 34 in the detectable range 2a of the radar 2A as the detection range of the radar 2A. Note that the detectable range 2a of the radar 2A is a range in which the radar 2A can measure distance data in the cabin, in other words, a range in which the radar 2A can transmit a millimeter wave and receive a reflected wave which is the millimeter wave reflected by a moving object.

Before describing the detection range of the radar 2A determined by the detection range determining unit 15, first, various states inside the cabin will be described with reference to FIG. 4 with some examples.

Figure 4A:
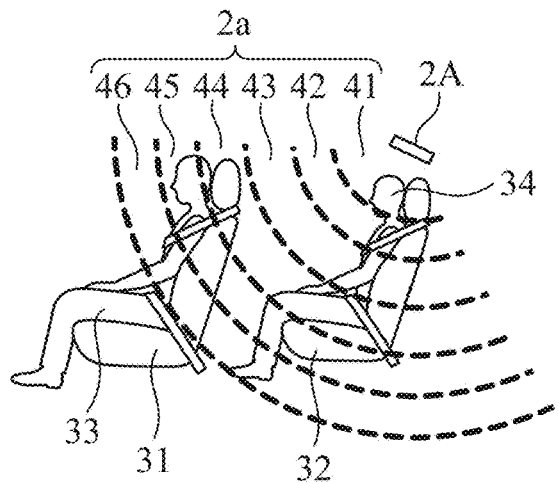
FIGS. 4A, 4B, and 4C are diagrams illustrating an example of a positional relationship among front seats, rear seats, and divided areas in the first embodiment.

FIG. 4A illustrates a state inside the cabin where the front-seat occupant 33 and the rear-seat occupant 34 are seated in a front seat 31 at a standard position and a rear seat 32 at a standard position, respectively. The front-seat occupant 33 and the rear-seat occupant 34 are both adults.

The detection range determining unit 15 divides the detectable range 2a of the radar 2A into, for example, a first area 41 close to the installation position of the radar 2A, a second area 42 farther away from the installation position than the first area 41, a third area 43 farther away from the installation position than the second area 42, a fourth area 44 farther away from the installation position than the third area 43, a fifth area 45 farther away from the installation position than the fourth area 44, and a sixth area 46 farther away from the installation position than the fifth area 45. Each of the first area 41, the second area 42, the third area 43, the fourth area 44, the fifth area 45, and the sixth area 46 is a divided area. In the illustrated example, the first area 41 is an area including the headrest of the rear seat 32. The second area 42 and the third area 43 are areas including the backrest of the rear seat 32. The areas including the backrest are divided into an area on the headrest side and an area on the seat surface side of the rear seat 32. The second area 42 is an area on the headrest side, and the third area 43 is an area on the seat surface side. The fourth area 44 is an area including the seat surface of the rear seat 32. The fifth area 45 and the sixth area 46 are areas including the foot space of the rear seat 32.

Here, in order to make it possible to detect the rear-seat occupant 34 with various physiques or the rear-seat occupant 34 in various postures using the distance data measured by the radar 2A, it is desirable to set a range as wide as possible as a detection range of the radar 2A. However, in order to prevent the front-seat occupant 33 from being erroneously detected as the rear-seat occupant 34, the detection range of the radar 2A needs to be a range in which the front-seat occupant 33 does not enter.

For example, in a case where the state inside the cabin is as illustrated in FIG. 4A, if the fourth area 44, the fifth area 45, and the sixth area 46 are included in the detection range of the radar 2A, the rear-seat occupant detecting unit 142 erroneously detects the front-seat occupant 33 as the rear-seat occupant 34 on the basis of the distance data classified into the fourth area 44, the fifth area 45, and the sixth area 46.

Figure 4B:
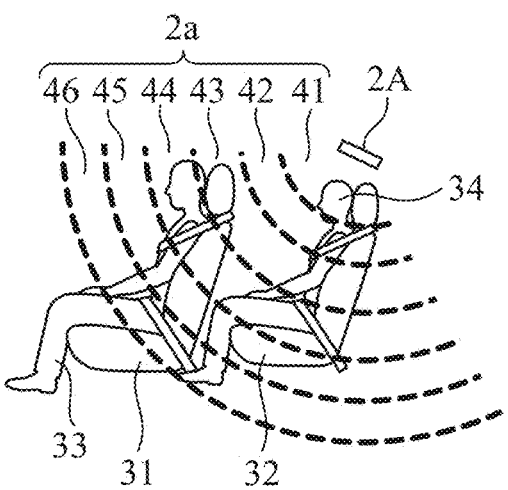

On the other hand, for example, as illustrated in FIG. 4B, the state inside the cabin is a state in which the front-seat occupant 33 is seated on the front seat 31 with the sliding position largely shifted toward the rear seat 32. The rear-seat occupant 34 is seated on the rear seat 32. The front-seat occupant 33 and the rear-seat occupant 34 are both adults.

For example, in a case where the state inside the cabin is as illustrated in FIG. 4B, if not only the fourth area 44, the fifth area 45, and the sixth area 46 but also the third area 43 is included in the detection range of the radar 2A, the rear-seat occupant detecting unit 142 erroneously detects the front-seat occupant 33 as the rear-seat occupant 34 on the basis of the distance data classified into the third area 43, the fourth area 44, the fifth area 45, or the sixth area 46. In FIG. 4B, it is assumed that the rear-seat occupant 34 is present in the rear seat 32, but even in a case where the rear-seat occupant 34 is not present in the rear seat 32, the rear-seat occupant detecting unit 142 erroneously detects the front-seat occupant 33 as the rear-seat occupant 34 on the basis of the distance data classified into the third area 43, the fourth area 44, the fifth area 45, and the sixth area 46.

Figure 4C:
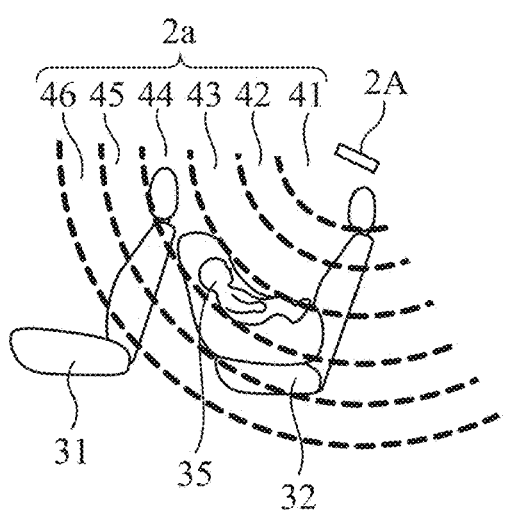

Assuming that the state inside the cabin can be as illustrated in FIG. 4B, it is assumed that the detection range of the radar 2A is fixedly determined so that the third area 43 to the sixth area 46 are not included in the detection range. Then, there arises a possibility that the rear-seat occupant detecting unit 142 may erroneously detect the rear-seat occupant 34. For example, as illustrated in FIG. 4C, the state inside the cabin is a state in which an infant 35 on a child seat is assumed to be present as the rear-seat occupant 34 in the rear seat 32. There is no occupant other than the infant 35.

In a case where the state inside the cabin is as illustrated in FIG. 4C, unless the third area 43 or the fourth area 44 is included in the detection range of the radar 2A, the rear-seat occupant detecting unit 142 erroneously detects that the rear-seat occupant 34 is not present.

As described above, when the rear-seat occupant 34 is detected by the radar 2A, the range in which the rear-seat occupant 34 can be correctly detected in the detectable range 2a changes depending on the presence or absence of the front-seat occupant 33, the position of the front-seat occupant 33 when the front-seat occupant 33 is present, the posture of the front-seat occupant 33, the position of the rear-seat occupant 34 when the rear-seat occupant 34 is present, or the like.

The detection range of the radar 2A needs to be set to be as wide as possible in the detectable range 2a (the first area 41 to the sixth area 46) and to include an area in which the rear-seat occupant 34 is not erroneously detected.

Therefore, the detection range determining unit 15 dynamically determines the detection range of the radar 2A on the basis of the position of the front-seat occupant 33.

FIG. 5 is a diagram for explaining an example of the detection range of the radar 2A determined by the detection range determining unit 15.

In FIG. 5, the detection range of the radar 2A determined by the detection range determining unit 15 is illustrated as a detection range 51.

Figure 5A:
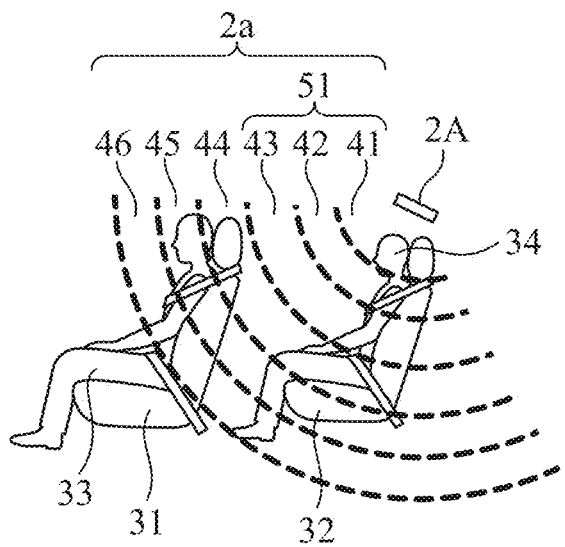
FIGS. 5A, 5B, 5C, and 5D are diagrams illustrating an example of a concept of a detection range determined by a detection range determining unit in the first embodiment.

For example, when the state inside the cabin is a state as illustrated in FIG. 4A, the detection range determining unit 15 determines the first area 41, the second area 42, and the third area 43 as the detection range 51 of the radar 2A so as not to erroneously detect the front-seat occupant 33 as the rear-seat occupant 34 (see FIG. 5A).

It is assumed that the rear-seat occupant detecting unit 142 can detect the rear-seat occupant 34 when the distance data is classified into the first area 41, the second area 42, or the third area 43, that is, when the millimeter wave transmitted by the radar 2A is reflected in the first area 41, the second area 42, or the third area 43. The rear-seat occupant detecting unit 142 can also determine the physique of the detected rear-seat occupant 34 depending on into which area the distance data is classified, and determine whether the rear-seat occupant 34 is an adult, an infant 35, or a pet on the basis of the determination result. Specifically, for example, when the distance data is classified into the first area 41, the rear-seat occupant detecting unit 142 determines that the detected rear-seat occupant 34 is an adult. Further, for example, when the distance data is classified into the third area 43, the rear-seat occupant detecting unit 142 determines that the detected rear-seat occupant 34 is the infant 35. Note that, in the first embodiment, an adult is an occupant with a physique that allows the occupant to get out of the vehicle on his/her own if the occupant is left in the vehicle 30, and an infant 35 is an occupant with a physique that has difficulty of getting out of the vehicle 30 on his/her own if the occupant is left in the vehicle 30.

Figure 5C:
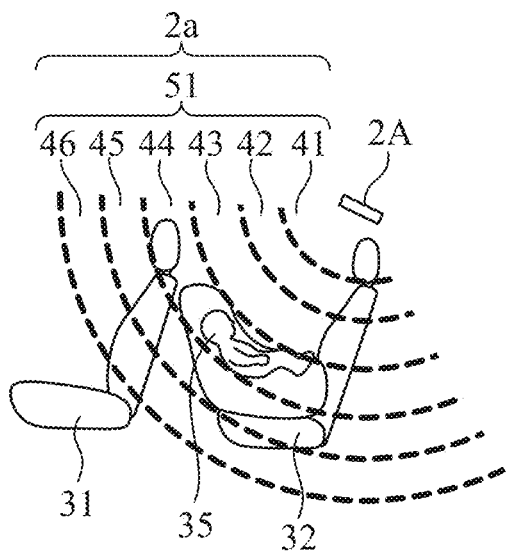
Figure 5B:
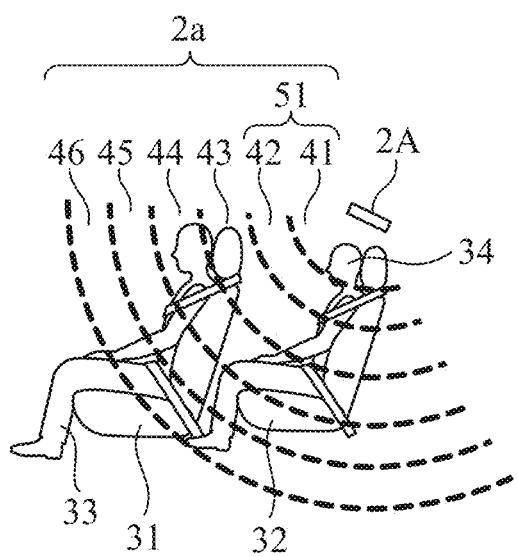
Figure 5D:
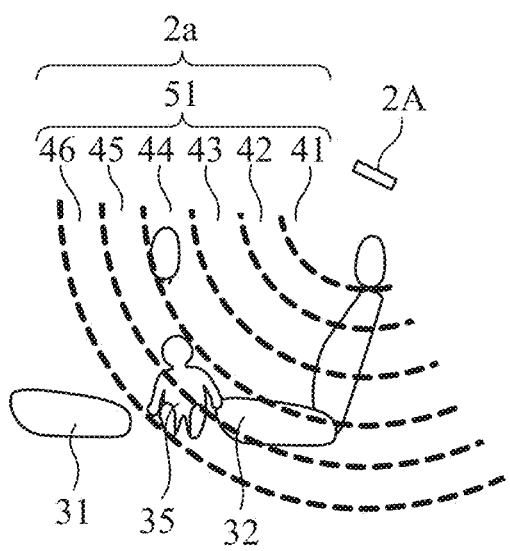

For example, when the state inside the cabin is a state as illustrated in FIG. 4B, the detection range determining unit 15 determines the first area 41 and the second area 42 as the detection range 51 of the radar 2A so as not to erroneously detect the front-seat occupant 33 as the rear-seat occupant 34 (see FIG. 5B).

When the distance data is classified into the first area 41 and the second area 42, that is, when the millimeter wave transmitted by the radar 2A is reflected in the first area 41 or the second area 42, the rear-seat occupant detecting unit 142 determines that the rear-seat occupant 34 can be detected.

For example, when the state inside the cabin is a state as illustrated in FIG. 4C, the detection range determining unit 15 determines the first area 41, the second area 42, the third area 43, the fourth area 44, the fifth area 45, and the sixth area 46 as the detection range 51 of the radar 2A so as not to erroneously detect that the rear-seat occupant 34 is not present although the rear-seat occupant 34 is present (see FIG. 5C).

When the infant 35 on a child seat is present in the rear seat 32, the rear-seat occupant detecting unit 142 can detect the infant 35 even if the first area 41, the second area 42, the third area 43, and the fourth area 44 are determined as the detection range 51 of the radar 2A. However, when the front-seat occupant 33 is not present, the detection range determining unit 15 sets the detection range 51 of the radar 2A as wide as possible. That is, the detection range determining unit 15 determines the detection range 51 of the radar 2A so that the detection range 51 includes the fifth area 45 and the sixth area 46. As a result, the rear-seat occupant detecting unit 142 can detect the rear-seat occupant 34 more reliably than in a case where the fifth area 45 and the sixth area 46 are not included in the detection range 51 of the radar 2A. Specifically, for example, even when there is an infant 35 playing at the foot space or a pet (not illustrated) is present at the foot space, the rear-seat occupant detecting unit 142 can detect the infant 35 or the pet (see FIG. 5D).

That is, when the front-seat occupant 33 is not detected, the detection range determining unit 15 does not erroneously detect the front-seat occupant 33 as the rear-seat occupant 34. Therefore, in order to widen the detection range of the radar 2A as wide as possible, the detectable range 2a of the radar 2A is set as the detection range of the radar 2A. Note that the detection range determining unit 15 acquires information indicating that the front-seat occupant 33 is not detected from the front-seat occupant detecting unit 141.

The detection range determining unit 15 can also determine that there is no detection range of the radar 2A.

Figure 6:
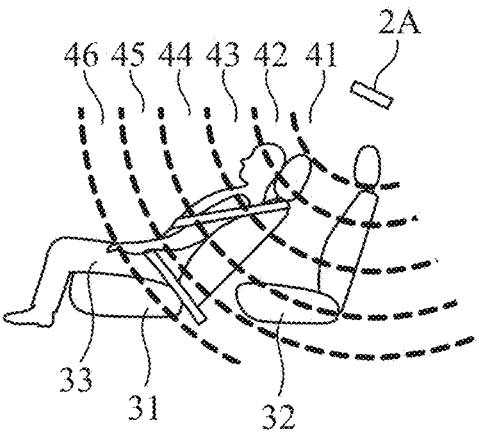
FIG. 6 is a diagram illustrating an example of a state inside the cabin when the detection range determining unit determines that there is no detection range of the radar in the first embodiment.

FIG. 6 is a diagram illustrating an example of a state inside the cabin when the detection range determining unit 15 determines that there is no detection range of the radar 2A in the first embodiment.

In FIG. 6, the state inside the cabin is a state in which the front-seat occupant 33 largely reclines the backrest of the front seat 31 toward the rear seat 32. The front-seat occupant 33 is an adult. No rear-seat occupant 34 is present in the rear seat 32.

For example, when the state inside the cabin is a state as illustrated in FIG. 6, the position of the front-seat occupant 33 largely enters the detectable range 2a (the first area 41 to the sixth area 46) of the radar 2A. There is a high possibility that the rear-seat occupant detecting unit 142 erroneously detects the front-seat occupant 33 as the rear-seat occupant 34.

When the position of the front-seat occupant 33 largely enters the detectable range 2a of the radar 2A, the detection range determining unit 15 determines that detection of the rear-seat occupant 34 based on the distance data is impossible, and determines that there is no detection range of the radar 2A.

The detection range determining unit 15 determines whether the position of the front-seat occupant 33 is within the rear-seat occupant undetectable area in the cabin and determines whether the position of the front-seat occupant 33 largely enters the detectable range 2a of the radar 2A. The rear-seat occupant undetectable area can be set as appropriate. The rear-seat occupant undetectable area may be, for example, an area of the second area 42 in the detectable range 2a of the radar 2A, or may be a predetermined area in the cabin.

As described above, the detection range determining unit 15 dynamically determines the detection range of the radar 2A on the basis of the position of the front-seat occupant 33 estimated by the front-seat occupant position estimating unit 1411.

The detection range determining unit 15 outputs information on the determined detection range of the radar 2A to the rear-seat occupant detecting unit 142.

When determining that there is no detection range of the radar 2A, the detection range determining unit 15 outputs information indicating that it is determined that there is no detection range of the radar 2A to the rear-seat occupant detecting unit 142 and the sensor control unit 16.

When the detection range determining unit 15 determines that there is no detection range of the radar 2A, the sensor control unit 16 turns off the power of the radar 2A. Specifically, for example, the sensor control unit 16 transmits a control signal for turning off the power of the radar 2A to the radar 2A.

The operation of the cabin-inside detection device 10 according to the first embodiment will be described.

Figure 7:
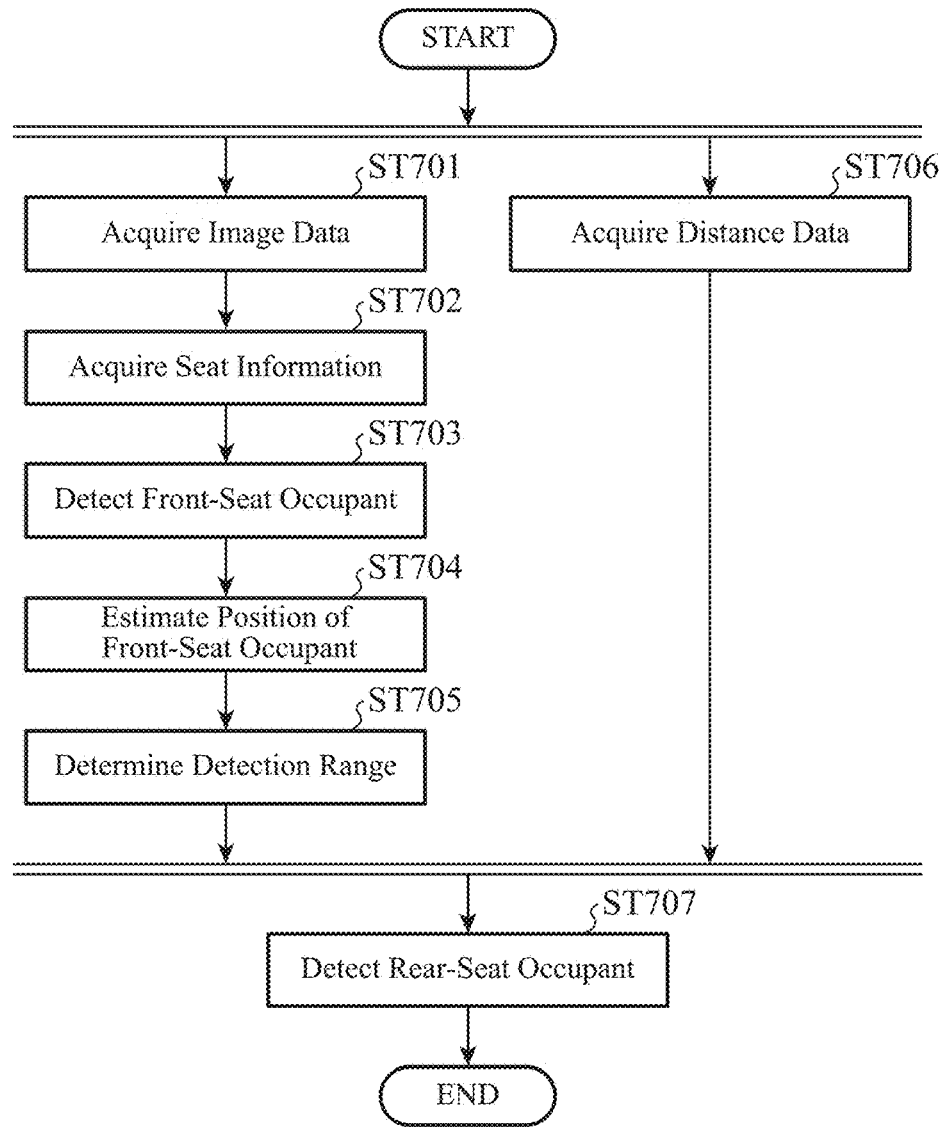
FIG. 7 is a flowchart for explaining an operation of the cabin-inside detection device according to the first embodiment.

FIG. 7 is a flowchart for explaining the operation of the cabin-inside detection device 10 according to the first embodiment.

The image acquisition unit 11A acquires, from the camera 1A, image data obtained by imaging inside the cabin by the camera 1A (step ST701). The image acquisition unit 11A outputs the image data acquired from the camera 1A to the front-seat occupant detecting unit 141 of the occupant detection unit 14.

The seat information acquiring unit 13 acquires seat information (step ST702).

The seat information acquiring unit 13 outputs the acquired seat information to the front-seat occupant detecting unit 141.

The front-seat occupant detecting unit 141 detects the front-seat occupant 33 of the vehicle 30 on the basis of the image data acquired by the image acquisition unit 11A in step ST701 (step ST703).

When the front-seat occupant 33 is not detected, the front-seat occupant detecting unit 141 outputs information indicating that the front-seat occupant 33 is not detected to the detection range determining unit 15. Then, the operation of the cabin-inside detection device 10 skips step ST704 and proceeds to step ST705.

When the front-seat occupant detecting unit 141 detects the front-seat occupant 33 in step ST703, the front-seat occupant position estimating unit 1411 estimates the position of the front-seat occupant 33 on the basis of the image data acquired by the image acquisition unit 11A in step ST701 and the seat information acquired by the seat information acquiring unit 13 in step ST702 (step ST704).

The front-seat occupant position estimating unit 1411 outputs information regarding the estimated position of the front-seat occupant 33 to the detection range determining unit 15.

The detection range determining unit 15 determines the detection range of the radar 2A on the basis of the position of the front-seat occupant 33 estimated by the front-seat occupant position estimating unit 1411 in step ST704 (step ST705).

The detection range determining unit 15 outputs information on the determined detection range of the radar 2A to the rear-seat occupant detecting unit 142.

When determining that there is no detection range of the radar 2A, the detection range determining unit 15 outputs information indicating that it is determined that there is no detection range of the radar 2A to the rear-seat occupant detecting unit 142 and the sensor control unit 16.

The distance acquisition unit 12A acquires, from the radar 2A, distance data obtained by measuring the distance to each object in the cabin by the radar 2A (step ST706). The distance acquisition unit 12A outputs the distance data acquired from the radar 2A to the rear-seat occupant detecting unit 142.

The rear-seat occupant detecting unit 142 detects the rear-seat occupant 34 of the vehicle 30 on the basis of the distance data acquired by the distance acquisition unit 12A in step ST706 and the detection range of the radar 2A determined by the detection range determining unit 15 in step ST705 (step ST707).

When the detection range determining unit 15 determines that there is no detection range of the radar 2A, the rear-seat occupant detecting unit 142 does not detect the rear-seat occupant 34. In this case, the sensor control unit 16 turns off the power of the radar 2A.

With respect to the operation of the cabin-inside detection device 10 illustrated in the flowchart of FIG. 7, the operations of steps ST701 to ST705 and the operation of step ST706 are performed in parallel.

In the flowchart of FIG. 7, the cabin-inside detection device 10 operates in the order of step ST701 and step ST702, but the cabin-inside detection device 10 may operate in the order of step ST702 and step ST701.

In this manner, the cabin-inside detection device 10 determines the detection range of the radar 2A on the basis of the position of the front-seat occupant 33 estimated from the image data. The cabin-inside detection device 10 detects the rear-seat occupant 34 on the basis of the distance data acquired from the radar 2A and the determined detection range of the radar 2A.

Since the cabin-inside detection device 10 dynamically determines the detection range of the radar 2A on the basis of the position of the front-seat occupant 33, the rear-seat occupant 34 can be detected in consideration of the seated state of the front-seat occupant 33.

Information (hereinafter, referred to as "detected occupant information") on the occupant detected by the cabin-inside detection device 10 is output by an output unit (not illustrated) included in the cabin-inside detection device 10 and used in various functions. Note that the detected occupant information includes information on whether or not an occupant has been detected, information on whether the detected occupant is the front-seat occupant 33 or the rear-seat occupant 34 or information on whether the detected occupant is an adult or a person other than an adult (the infant 35 or a pet) when the occupant has been detected, and the like. As described above, the cabin-inside detection device 10 can perform occupant detection in consideration of a difference in physique depending on into which divided area the distance data is classified in the detection range of the radar 2A.

The output unit of the cabin-inside detection device 10 outputs the detected occupant information to an external device (not illustrated). The external device may be, for example, at least one of a speaker or a display mounted on the vehicle 30, an occupant in the vehicle 30, a mobile terminal or the like carried by an owner of the vehicle 30, or a hazard lamp, a horn (honker), or the like mounted on the vehicle 30.

For example, the detected occupant information is used in a vehicle theft prevention function. As a specific example, it is assumed that a control unit (not illustrated) of the vehicle 30 detects application of a large impact to the vehicle 30 or opening and closing of a door in a locked state while the vehicle 30 is parked. In this case, the cabin-inside detection device 10 activates the camera 1A and the radar 2A, acquires image data and distance data from the camera 1A and the radar 2A, respectively, and detects a person present in the cabin. Then, the cabin-inside detection device 10 outputs the detected occupant information to a mobile terminal carried by the owner of the vehicle 30. As a result, the owner of the vehicle 30 can detect, for example, intrusion of someone into the vehicle 30. For example, the cabin-inside detection device 10 outputs the image data acquired from the camera 1A together with the detected occupant information to a security system. The cabin-inside detection device 10 and the security system are connected via a network.

In the security system, it is also possible to prevent the theft of the vehicle 30 by grasping the situation inside the cabin on the basis of the detected occupant information and the camera 1A and remotely controlling the vehicle 30. The control of the vehicle 30 performed remotely by the security system is, for example, control of not turning on the engine.

Further, for example, when the cabin-inside detection device 10 detects an occupant while the vehicle 30 is stopped, the detected occupant information is used in the infant leaving detection function. The cabin-inside detection device 10 outputs detected occupant information to an infant leaving detection device (not illustrated). The cabin-inside detection device 10 and the infant leaving detection device are connected via a network.

For example, when detected occupant information indicating that the infant 35 is detected is output from the cabin-inside detection device 10, the infant leaving detection device determines that there is a possibility that the infant leaving has occurred. At this time, if it can be determined from the detected occupant information that not only the infant 35 but also an adult has been detected, the infant leaving detection device can determine that not the infant leaving but, for example, the vehicle owner (adult) intentionally takes a rest or waits in the cabin, and turn off the leaving alarm. The cabin-inside detection device 10 may output the image data acquired from the camera 1A together with the detected occupant information to the infant leaving detection device, and the infant leaving detection device may determine whether or not an adult is present other than the infant 35 from the image data.

For example, when the cabin-inside detection device 10 detects an occupant while the vehicle 30 is traveling, the detected occupant information is used in a seat belt reminder.

Figure 8A:
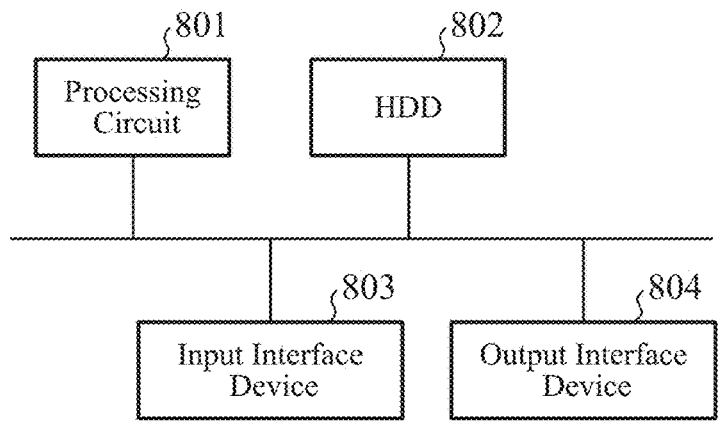
FIGS. 8A and 8B are diagrams illustrating an example of a hardware configuration of the cabin-inside detection device according to the first embodiment.
Figure 8B:
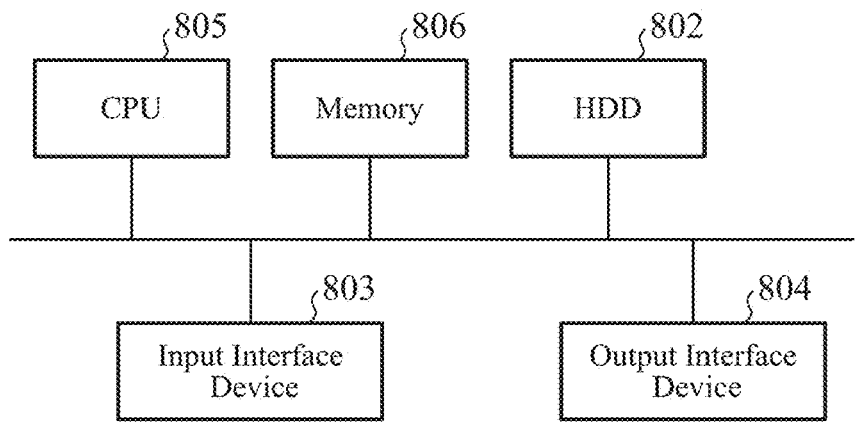

FIGS. 8A and 8B are diagrams illustrating an example of a hardware configuration of the cabin-inside detection device 10 according to the first embodiment.

In the first embodiment, the functions of the image acquisition unit 11A, the distance acquisition unit 12A, the seat information acquiring unit 13, the occupant detection unit 14, the detection range determining unit 15, and the sensor control unit 16 are implemented by a processing circuit 801. That is, the cabin-inside detection device 10 includes the processing circuit 801 for performing control to detect an occupant in the cabin of the vehicle 30.

The processing circuit 801 may be dedicated hardware as illustrated in FIG. 8A, or may be a central processing unit (CPU) 805 that executes a program stored in a memory 806 as illustrated in FIG. 8B.

In a case where the processing circuit 801 is dedicated hardware, the processing circuit 801 corresponds to, for example, a single circuit, a composite circuit, a programmed processor, a parallel programmed processor, an application specific integrated circuit (ASIC), a field-programmable gate array (FPGA), or a combination thereof.

When the processing circuit 801 is the CPU 805, the functions of the image acquisition unit 11A, the distance acquisition unit 12A, the seat information acquiring unit 13, the occupant detection unit 14, the detection range determining unit 15, and the sensor control unit 16 are implemented by software, firmware, or a combination of software and firmware. That is, the image acquisition unit 11A, the distance acquisition unit 12A, the seat information acquiring unit 13, the occupant detection unit 14, the detection range determining unit 15, and the sensor control unit 16 are implemented by a processing circuit such as the CPU 805 and a system large-scale integration (LSI) that execute a program stored in a hard disk drive (HDD) 802, the memory 806, or the like. It can also be said that the program stored in the HDD 802, the memory 806, or the like causes a computer to execute the procedures or methods performed by the image acquisition unit 11A, the distance acquisition unit 12A, the seat information acquiring unit 13, the occupant detection unit 14, the detection range determining unit 15, and the sensor control unit 16. Here, the memory 806 corresponds to, for example, a nonvolatile or volatile semiconductor memory such as a random access memory (RAM), a read only memory (ROM), a flash memory, an erasable programmable read only memory (EPROM), or an electrically erasable programmable read-only memory (EEPROM), or a magnetic disk, a flexible disk, an optical disk, a compact disk, a mini disk, a digital versatile disc (DVD), or the like.

Note that, the functions of the image acquisition unit 11A, the distance acquisition unit 12A, the seat information acquiring unit 13, the occupant detection unit 14, the detection range determining unit 15, and the sensor control unit 16 may be partially implemented by dedicated hardware, and partially implemented by software or firmware. For example, the functions of the image acquisition unit 11A, the distance acquisition unit 12A, and the seat information acquiring unit 13 can be implemented by the processing circuit 801 as dedicated hardware, and the functions of the occupant detection unit 14, the detection range determining unit 15, and the sensor control unit 16 can be implemented by the processing circuit 801 reading and executing programs stored in the memory 806.

The cabin-inside detection device 10 further includes an input interface device 803 and an output interface device 804 that perform wired communication or wireless communication with a device such as the camera 1A, the radar 2A, or an external device.

In the first embodiment described above, the detection range determining unit 15 divides the detectable range 2a in which the radar 2A can measure distance data into a plurality of divided areas (first area 41, second area 42, third area 43, fourth area 44, fifth area 45, and sixth area 46) for determining whether or not the acquired distance data can be used for detection of the rear-seat occupant 34, and dynamically determines the detection range of the radar 2A by changing the divided areas. However, this is merely an example. The detection range determining unit 15 may dynamically determine the detection range of the radar 2A by changing the direction in which the radar 2A transmits the millimeter wave. In addition, the detection range determining unit 15 may determine the detection range of the radar 2A by a combination of the divided areas and the direction in which the radar 2A transmits the millimeter wave.

For example, in the first embodiment described above, the example is described in which when the state inside the cabin is a state as illustrated in FIG. 4, the detection range determining unit 15 sets the first area 41 and the second area 42 in the detectable range 2a (the first area 41 to the sixth area 46) of the radar 2A as the detection range of the radar 2A (see FIG. 5B). For example, when the state inside the cabin is a state as illustrated in FIG. 4, the detection range determining unit 15 may determine, as the detection range of the radar 2A, a divided area not including the position of the front-seat occupant 33 while directing the direction in which the radar 2A transmits the millimeter wave toward the rear seat 32.

Figure 9:
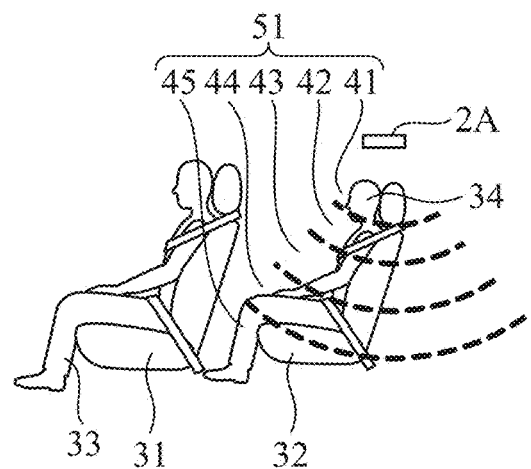
FIG. 9 is a diagram for explaining an example of a concept of a detection range in a case where the detection range is determined by changing a direction in which the radar transmits a millimeter wave in the first embodiment.

FIG. 9 is a diagram for describing an example of a concept of the detection range in a case where when the state inside the cabin is a state as illustrated in FIG. 4, the detection range determining unit 15 determines, as the detection range of the radar 2A, a divided area not including the position of the front-seat occupant 33 while directing the direction in which the radar 2A transmits the millimeter wave toward the rear seat 32.

In FIG. 9, the detection range determining unit 15 sets the first area 41, the second area 42, the third area 43, the fourth area 44, and the fifth area 45 as the detection range of the radar 2A after the millimeter wave transmitted from the radar 2A toward substantially the center of the detectable range 2a is transmitted toward the headrest of the rear seat 32.

Note that the detection range determining unit 15 may change the direction in which the radar 2A transmits the millimeter wave via the sensor control unit 16.

In the first embodiment described above, the radar 2A is installed above the rear seat 32 (see FIGS. 2 and 4 to 6), but this is merely an example. The radar 2A may be installed in a cabin above a seat installed in the cabin. As long as the radar 2A is installed above the seat installed in the cabin, for example, the radar 2A may be installed in a pillar.

Note that the radar 2A is desirably installed above the seat installed in the cabin and further on the front seat 31 side of the position above the rear seat 32. This is because, for example, when an iron plate is embedded in the backrest portion of the rear seat 32, there is a possibility that the millimeter wave transmitted by the radar 2A does not pass through the rear seat 32 due to the iron plate. If the millimeter wave is not transmitted, the cabin-inside detection device 10 cannot detect the rear-seat occupant 34 in the rear seat 32.

Here, FIG. 10 is a diagram for describing an example of the installation position of the radar 2A and an example of a detection range 1001 of the radar 2A determined by the detection range determining unit 15 in a case where the radar 2A is installed in a place other than above the rear seat 32.

In FIG. 10, the radar 2A is installed above the front seat 31. The radar 2A is installed above the front seat 31 when the front seat 31 is at a standard position.

Figure 10A:
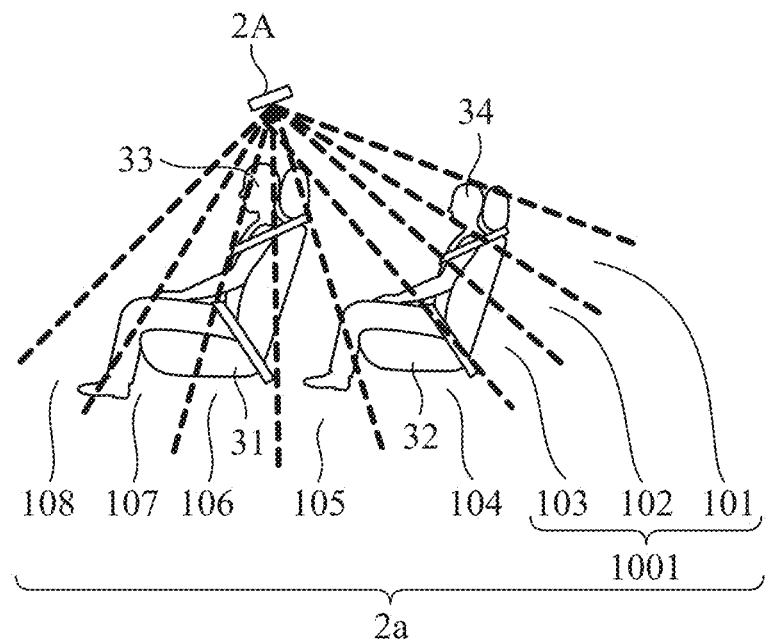
FIGS. 10A and 10B are diagrams for explaining an example of an installation position of the radar and an example of a detection range of the radar in a case where the radar is installed at a place other than above the rear seat.

Similarly to FIG. 4A, FIG. 10A illustrates a state inside the cabin in which the front-seat occupant 33 and the rear-seat occupant 34 are seated on the front seat 31 at a standard position and the rear seat 32 at a standard position, respectively.

Figure 10B:
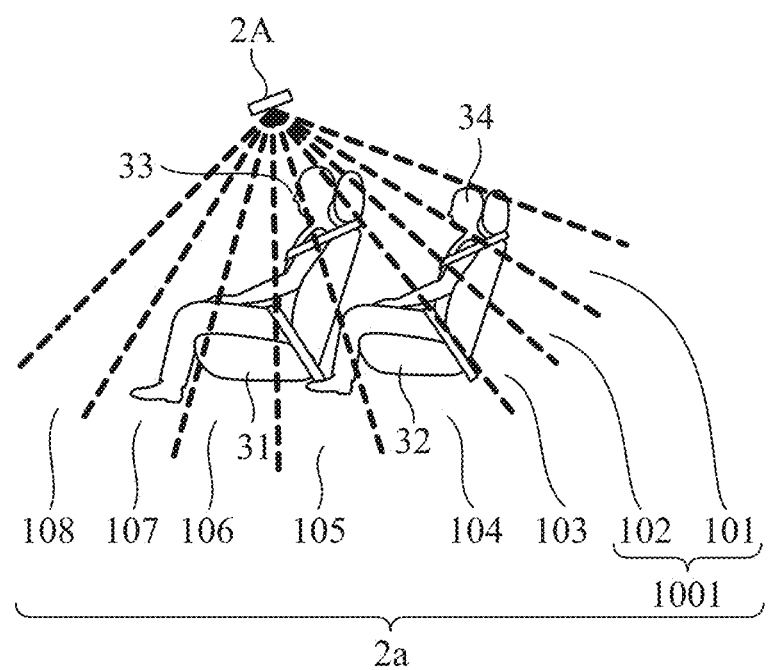

Similarly to FIG. 4B, FIG. 10B illustrates a state inside the cabin in which the front-seat occupant 33 is seated on the front seat 31 with the slide position largely shifted toward the rear seat 32, and the rear-seat occupant 34 is seated on the rear seat 32.

An example of the detection range of the radar 2A determined by the detection range determining unit 15 when the state inside the cabin is a state as illustrated in FIG. 10A will be described.

The detection range determining unit 15 divides the detectable range 2a of the radar 2A into a plurality of divided areas. In FIG. 10A, the detection range determining unit 15 divides the detectable range 2a into, for example, a first area 101 in which the millimeter wave from the radar 2A is transmitted rearmost with respect to the traveling direction of the vehicle 30, a second area 102 on the front side (hereinafter, simply referred to as a "front side of the vehicle 30") of the first area 101 with respect to the traveling direction of the vehicle 30, a third area 103 on the front side of the vehicle 30 with respect to the second area 102, a fourth area 104 on the front side of the vehicle 30 with respect to the third area 103, a fifth area 105 on the front side of the vehicle 30 with respect to the fourth area 104, a sixth area 106 on the front side of the vehicle 30 with respect to the fifth area 105, a seventh area 107 on the front side of the vehicle 30 with respect to the sixth area 106, and an eighth area 108 on the front side of the vehicle 30 with respect to the seventh area 107. Each of the first area 101 to the eighth area 108 is a divided area. In the illustrated example, the first area 101 is an area including the headrest of the rear seat 32. The second area 102 and the third area 103 are areas including the backrest of the rear seat 32. The areas including the backrest are divided into an area on the headrest side and an area on the seat surface side of the rear seat 32. The second area 102 is the area on the headrest side, and the third area 103 is the area on the seat surface side. The fourth area 104 is an area including a seat surface of the rear seat 32. The fifth area 105 is an area including the foot space of the rear seat 32. The sixth area 106 and the seventh area 107 are areas including the front seat 31, and the eighth area 108 is an area including the foot space of the front seat 31.

In this manner, the detection range determining unit 15 can also divide the detectable range 2a along the direction in which the millimeter wave from the radar 2A is transmitted.

Note that the detection range determining unit 15 may divide the detectable range 2a into divided areas by combining the method of dividing in accordance with the distance from the installation position of the radar 2A (see, for example, the first area 41 to the sixth area 46 in FIG. 4) and the method of dividing as illustrated in FIG. 10A.

For example, when the state inside the cabin is as illustrated in FIG. 10A, if the fourth area 104 to the eighth area 108 are included in the detection range of the radar 2A, the rear-seat occupant detecting unit 142 erroneously detects the front-seat occupant 33 as the rear-seat occupant 34 on the basis of the distance data classified into the fourth area 104 to the eighth area 108.

Therefore, the detection range determining unit 15 determines the first area 101, the second area 102, and the third area 103 as the detection range 1001 of the radar 2A so that the rear-seat occupant detecting unit 142 does not erroneously detect the front-seat occupant 33 as the rear-seat occupant 34.

On the other hand, when the state inside the cabin is a state inside the cabin as illustrated in FIG. 10B, if not only the fourth area 104 to the eighth area 108 but also the third area 103 are included in the detection range of the radar 2A, the rear-seat occupant detecting unit 142 erroneously detects the front-seat occupant 33 as the rear-seat occupant 34 on the basis of the distance data classified into the third area 103 to the eighth area 108. In FIG. 10B, it is assumed that the rear-seat occupant 34 is present in the rear seat 32, but also in a case where the rear-seat occupant 34 is not present in the rear seat 32, the rear-seat occupant detecting unit 142 detects the front-seat occupant 33 as the rear-seat occupant 34.

Therefore, the detection range determining unit 15 determines the first area 101 and the second area 102 as the detection range 1001 of the radar 2A so as not to erroneously detect the front-seat occupant 33 as the rear-seat occupant 34.

As illustrated in FIG. 10A, the detection range determining unit 15 can divide the detectable range 2a in accordance with the width of the range in which the millimeter wave is transmitted from the radar 2A.

Figure 11:
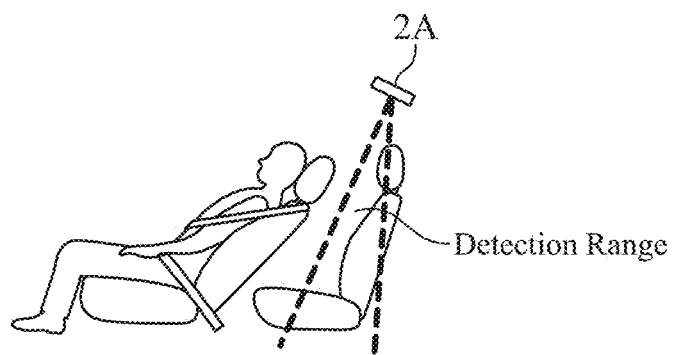
FIG. 11 is a diagram for explaining an example of a method of dividing a detectable range by the detection range determining unit in the first embodiment.

Therefore, for example, as shown in FIG. 6, when the state inside the cabin is a state in which the front-seat occupant 33 largely reclines the backrest of the front seat 31 toward the rear seat 32, the detection range determining unit 15 can divide the detectable range 2a in accordance with the width of the range in which the millimeter wave is transmitted, and set the divided area along the backrest of the rear seat 32 as the detection range (see FIG. 11). As a result, when the rear-seat occupant 34 is present, the rear-seat occupant detecting unit 142 can detect the rear-seat occupant 34 without erroneously detecting the front-seat occupant 33 as the rear-seat occupant 34. However, in this case, the rear-seat occupant detecting unit 142 cannot perform occupant detection in which a difference in physique is determined. Specifically, when the rear-seat occupant 34 is present, the rear-seat occupant detecting unit 142 cannot determine whether the rear-seat occupant 34 is an adult, a child, or an infant.

In the first embodiment described above, the front-seat occupant position estimating unit 1411 estimates the position of the front-seat occupant 33 on the basis of the image data acquired by the image acquisition unit 11A and the seat information acquired by the seat information acquiring unit 13. However, this is merely an example. The front-seat occupant position estimating unit 1411 may estimate the position of the front-seat occupant 33 only from the image data without using the seat information. In this case, the cabin-inside detection device 10 can be configured not to include the seat information acquiring unit 13.

In the first embodiment described above, the cabin-inside detection device 10 includes the sensor control unit 16. However, the cabin-inside detection device 10 does not necessarily include the sensor control unit 16. However, the cabin-inside detection device 10 can prevent unnecessary operation of the radar 2A by including the sensor control unit 16.

In the first embodiment described above, the position of the front-seat occupant 33 is the head position of the front-seat occupant 33, but this is merely an example. The position of the front-seat occupant 33 may be, for example, a position of a shoulder of the front-seat occupant 33 or a position of an arm of the front-seat occupant 33.

In the first embodiment described above, the front-seat occupant detecting unit 141 detects the front-seat occupant 33 on the basis of the image data acquired by the image acquisition unit 11A, but this is merely an example. For example, the rear-seat occupant detecting unit 142 may detect the rear-seat occupant 34 and the front-seat occupant 33 on the basis of the distance data acquired by the distance acquisition unit 12A. For example, when the radar 2A is installed at a position as illustrated in FIG. 10, the rear-seat occupant detecting unit 142 can detect the front-seat occupant 33 on the basis of the distance data.

In the first embodiment described above, the first sensor 1 is the camera 1A, but the first sensor 1 may be a radar.

In the first embodiment described above, the cabin-inside detection device 10 is an in-vehicle device mounted on the vehicle 30, and the image acquisition unit 11A, the distance acquisition unit 12A, the seat information acquiring unit 13, the occupant detection unit 14, the detection range determining unit 15, and the sensor control unit 16 are included in the cabin-inside detection device 10. Alternatively, some of the image acquisition unit 11A, the distance acquisition unit 12A, the seat information acquiring unit 13, the occupant detection unit 14, the detection range determining unit 15, and the sensor control unit 16 may be mounted on an in-vehicle device of a vehicle, and the others may be provided in a server connected to the in-vehicle device via a network, and the in-vehicle device and the server may constitute a cabin-inside detection system.

As described above, the cabin-inside detection device 10 according to the first embodiment includes the first data acquiring unit 11 to acquire the first data acquired by the first sensor 1, the second data acquiring unit 12 to acquire the second data acquired by the second sensor 2 installed above the seat in the cabin, the front-seat occupant position estimating unit 1411 to estimate the position of the front-seat occupant 33 on the basis of the first data acquired by the first data acquiring unit 11, the detection range determining unit 15 to determine the detection range of the second sensor 2 on the basis of the position of the front-seat occupant 33 estimated by the front-seat occupant position estimating unit 1411, and the rear-seat occupant detecting unit 142 to detect the rear-seat occupant 34 on the basis of the second data acquired by the second data acquiring unit 12 and the detection range of the second sensor 2 determined by the detection range determining unit 15. Therefore, the cabin-inside detection device 10 can detect the rear-seat occupant 34 in consideration of the seated state of the front-seat occupant 33.

In the cabin-inside detection device 10 according to the first embodiment, the detection range determining unit 15 is configured to include the sensor control unit 16 that determines that there is no detection range of the second sensor 2 when the position of the front-seat occupant 33 estimated by the front-seat occupant position estimating unit 1411 is within the rear-seat occupant undetectable area in the cabin, and turns off the power of the second sensor 2 when the detection range determining unit 15 determines that there is no detection range of the second sensor 2. Therefore, the cabin-inside detection device 10 can prevent unnecessary operation of the radar 2A.

Note that, in the present disclosure, it is possible to modify any component of the embodiment or omit any component of the embodiment within the scope of the disclosure.

INDUSTRIAL APPLICABILITY

The cabin-inside detection device according to the present disclosure detects an occupant present in a rear seat in consideration of a seated state of the occupant present in a front seat, and thus is suitable for use in a cabin-inside detection device that detects an occupant in a cabin.

REFERENCE SIGNS LIST

1: first sensor, 1A: camera, 1a: imageable range, 2: second sensor, 2A: radar, 2a: detectable range, 51, 1001: detection range, 10: cabin-inside detection device, 11: first data acquiring unit, 11A: image acquisition unit, 12: second data acquiring unit, 12A: distance acquisition unit, 13: seat information acquiring unit, 14: occupant detection unit, 141: front-seat occupant detecting unit, 142: rear-seat occupant detecting unit, 1411: front-seat occupant position estimating unit, 15: detection range determining unit, 16: sensor control unit, 31: front seat, 32: rear seat, 33: front-seat occupant, 34: rear-seat occupant, 35: infant, 41, 101: first area, 42, 102: second area, 43, 103: third area, 44, 104: fourth area, 45, 105: fifth area, 106: sixth area, 107: seventh area, 108: eighth area, 801: processing circuit, 802: HDD, 803: input interface device, 804: output interface device, 805: CPU, 806: memory

The invention claimed is:
1. A cabin-inside detection device, comprising:
processing circuitry configured to
acquire first data acquired by a first sensor;
acquire second data acquired by a second sensor installed above a seat in a cabin;
estimate a position of a front-seat occupant on a basis of the acquired first data;
determine a detection range of the second sensor on a basis of the estimated position of the front-seat occupant; and
detect a rear-seat occupant on a basis of the acquired second data and the determined detection range of the second sensor.

2. The cabin-inside detection device according to claim 1, wherein the processing circuitry is further configured to acquire seat information on a seat in the cabin and estimate the position of the front-seat occupant on a basis of the acquired first data and the acquired seat information.

3. The cabin-inside detection device according to claim 1, wherein
the processing circuitry determines that there is no detection range of the second sensor when the estimated position of the front-seat occupant is within a rear-seat occupant undetectable area in the cabin, and
the processing circuitry turns off power of the second sensor when determining that there is no detection range of the second sensor.

4. The cabin-inside detection device according to claim 1, wherein
the first sensor is a camera, and
the first data is image data obtained by imaging inside the cabin by the camera.

5. The cabin-inside detection device according to claim 1, wherein
the second sensor is a radar, and
the second data is distance data obtained by measuring a distance to a moving object in the cabin by the radar.

6. The cabin-inside detection device according to claim 5, wherein the processing circuitry classifies an area in which the radar can measure the distance data into a plurality of divided areas for determining whether the acquired distance data can be used for occupant detection, and determines the detection range by changing the divided areas as the detection range or an angle at which the radar transmits a radio wave.

7. A cabin-inside detection method, comprising:
acquiring first data acquired by a first sensor;
acquiring second data acquired by a second sensor installed above a seat in a cabin;
estimating a position of a front-seat occupant on a basis of the acquired first data;
determining a detection range of the second sensor on a basis of the estimated position of the front-seat occupant; and
detecting a rear-seat occupant on a basis of the acquired second data and the determined detection range of the second sensor.

* * * * *